United States Patent
Hoey et al.

(10) Patent No.: US 9,862,909 B2
(45) Date of Patent: Jan. 9, 2018

(54) POLYMER FOR LUBRICANT COMPOSITIONS AND METHOD OF FORMING THE SAME

(71) Applicant: BASF SE, Ludwigshafen (DE)

(72) Inventors: Michael D. Hoey, Maplewood, NJ (US); Eugene F. Scanlon, Mamaroneck, NY (US); Kai Su, Middle Village, NY (US)

(73) Assignee: BASF SE, Ludwigshafen (DE)

( * ) Notice: Subject to any disclaimer, the term of this patent is extended or adjusted under 35 U.S.C. 154(b) by 51 days.

(21) Appl. No.: 14/420,844

(22) PCT Filed: Aug. 14, 2013

(86) PCT No.: PCT/US2013/054866
§ 371 (c)(1),
(2) Date: Feb. 10, 2015

(87) PCT Pub. No.: WO2014/028575
PCT Pub. Date: Feb. 20, 2014

(65) Prior Publication Data
US 2015/0203783 A1    Jul. 23, 2015

Related U.S. Application Data

(60) Provisional application No. 61/682,832, filed on Aug. 14, 2012.

(51) Int. Cl.
| | | |
|---|---|---|
| *C10M 149/10* | (2006.01) | |
| *C10M 159/00* | (2006.01) | |
| *C08F 220/18* | (2006.01) | |
| *C08F 220/34* | (2006.01) | |

(52) U.S. Cl.
CPC ......... *C10M 149/10* (2013.01); *C08F 220/18* (2013.01); *C08F 220/34* (2013.01); *C10M 159/005* (2013.01); *C08F 2220/1891* (2013.01); *C10M 2205/022* (2013.01); *C10M 2205/024* (2013.01); *C10M 2205/026* (2013.01); *C10M 2205/22* (2013.01); *C10M 2209/062* (2013.01); *C10M 2209/084* (2013.01); *C10M 2217/028* (2013.01); *C10N 2220/021* (2013.01); *C10N 2230/02* (2013.01); *C10N 2230/52* (2013.01)

(58) Field of Classification Search
CPC ............ C10M 149/10; C10M 159/005; C10M 2205/022; C10M 2205/024; C10M 2205/026; C10M 2205/22; C10M 2209/062; C10M 2209/084; C10M 2217/028; C10N 2220/021; C10N 2230/02; C10N 2230/52; C08F 220/18; C08F 220/34; C08F 2220/1891
USPC .................................................. 508/470, 262
See application file for complete search history.

(56) References Cited

U.S. PATENT DOCUMENTS

| | | | | |
|---|---|---|---|---|
| 3,793,199 | A | * | 2/1974 | Schlicht ................... C10M 1/08 252/75 |
| 5,073,278 | A | | 12/1991 | Schumacher et al. |
| 5,322,632 | A | * | 6/1994 | Gambini ............... C08F 220/18 252/401 |
| 5,874,389 | A | | 2/1999 | Boden et al. |
| 6,187,721 | B1 | | 2/2001 | Goldblatt et al. |
| 7,026,438 | B2 | | 4/2006 | Camenzind et al. |
| 7,932,218 | B2 | | 4/2011 | Chasan et al. |
| 8,030,259 | B2 | | 10/2011 | Aebli et al. |
| 2009/0221461 | A1 | | 9/2009 | Visger et al. |
| 2009/0312210 | A1 | | 12/2009 | Grisso et al. |
| 2011/0306528 | A1 | | 12/2011 | Gieselman et al. |
| 2012/0111079 | A1 | * | 5/2012 | Genat .................. C10M 111/02 72/54 |

FOREIGN PATENT DOCUMENTS

| | | |
|---|---|---|
| EP | 0 337 744 A2 | 10/1989 |
| EP | 0 356 677 A1 | 3/1990 |
| EP | 0 493 846 A1 | 7/1992 |
| EP | 0493846 A1 † | 7/1992 |

(Continued)

OTHER PUBLICATIONS

SciFinder Search Results for lubricants comprising claimed methacrylate copolymers, Aug. 29, 2016.*
International Search Report for Application No. PCT/US2013/054866 dated Nov. 18, 2013, 4 pages.
International Preliminary Report on Patentability dated Feb. 17, 2015.
English language abstract for EP 0 356 677 extracted from espacenet.com database on Apr. 21, 2016, 2 pages.
English language abstract and machine-assisted English translation for JPH 08-277323 extracted from espacenet.com database on May 17, 2017, 28 pages.

(Continued)

*Primary Examiner* — James Goloboy
(74) *Attorney, Agent, or Firm* — Lowenstein Sandler LLP

(57) ABSTRACT

A polymer comprises a polymeric backbone, at least one piperidine ester moiety extending from the polymeric backbone, and generally at least one $C_8$ to $C_{22}$ ester moiety extending from the polymeric backbone. The polymer is useful for adjusting the total base number and viscosity index of a lubricant composition. The lubricant composition generally comprises a base oil in addition to the polymer. A method of forming the polymer comprises the steps of providing a first component and providing a second component. The first component comprises at least one of A1) a piperidine methacrylate, or A2) a methacrylate. The second component comprises at least one of B) a $C_8$ to $C_{22}$ methacrylate. Optionally, the method further comprises the step of providing a third component, which comprises at least one of C) a piperidine-ol. The method further comprises at least one reaction step involving the aforementioned components to form the polymer.

7 Claims, No Drawings

(56) References Cited

FOREIGN PATENT DOCUMENTS

| | | | |
|---|---|---|---|
| JP | H 08-277323 A | | 10/1996 |
| JP | 2000-328088 A | | 11/2000 |
| JP | 2000328088 A | * | 11/2000 |
| JP | 2003-292982 A | | 10/2003 |
| WO | WO 99/57162 A1 | | 11/1999 |
| WO | WO 2011001414 A1 | * | 1/2011 ........... C10M 111/02 |

OTHER PUBLICATIONS

English language abstract and machine-assisted English translation for JP 2000-328088 extracted from espacenet.com database on May 17, 2017, 9 pages.

English language abstract and machine-assisted English translation for JP 2003-292982 extracted from espacenet.com database on May 17, 2017, 15 pages.

\* cited by examiner
† cited by third party

POLYMER FOR LUBRICANT COMPOSITIONS AND METHOD OF FORMING THE SAME

CROSS REFERENCE TO RELATED APPLICATIONS

This application is the National Stage of International Patent Application No. PCT/US2013/054866, filed on Aug. 14, 2013, which claims priority to and all the advantages of U.S. patent application Ser. No. 61/682,832, filed on Aug. 14, 2012, the content of which is incorporated herein by reference in its entirety.

FIELD OF THE INVENTION

The present invention generally relates to a polymer, and more specifically to a polymer useful for lubricant compositions and to a method of forming the polymer.

DESCRIPTION OF THE RELATED ART

Lubricant compositions are generally understood in the art. Attempts have been made to improve the performance of lubricant compositions by utilizing various compounds for reducing friction. Specifically, various friction-reducing compounds have been utilized in lubricant compositions to reduce friction within internal combustion engines of vehicles, which generally improves fuel economy of the vehicles. One aspect of such lubricant compositions is the amount of basic material dispersed/dissolved therein, which is often referred to as total base number or "TBN". TBN is generally measured by two ASTM titration methods, ASTM D2896 and ASTM D4739. Typically, TBN has been provided by using overbased metal soaps in the lubricant compositions, but these can cause problems with some newer engine technologies, such as interfering with diesel particulate filters. Overbased metal soaps can also add to Sulfated Ash, Phosphorus and Sulfur (SAPS) and are generally needed for new emission control devices. Certain TBN boosting compounds, such as amine compounds, may also be used to help neutralize acids formed during combustion in the engine. However, certain amine compounds can have detrimental effects on elastomeric seals.

In view of the foregoing, there remains an opportunity to provide improved lubricant compositions. There also remains an opportunity to provide methods of forming such improved lubricant compositions.

SUMMARY OF THE INVENTION AND ADVANTAGES

The present invention provides a polymer. The polymer comprises a polymeric backbone. At least one piperidine ester moiety extends from the polymeric backbone. In certain embodiments, at least one $C_8$ to $C_{22}$ ester moiety different from the piperidine ester moiety also extends from the polymeric backbone. In certain embodiments, the polymer has a weight average molecular weight (Mw) of at least about 20,000. The polymer is useful for adjusting the total base number (TBN) and viscosity index (VI) of a lubricant composition, which is also provided by the present invention. The lubricant composition comprises a base oil in addition to the polymer.

The present invention further provides a method of forming the polymer. The method comprises the steps of providing a first component and providing a second component different from the first component. The first component comprises at least one of A1) a piperidine methacrylate, or A2) a methacrylate different from the piperidine methacrylate A1). The second component comprises at least one of B) a $C_8$ to $C_{22}$ methacrylate. Optionally, the method further comprises the step of providing a third component. The third component comprises at least one of C) a piperidine-ol. The method further comprises at least one of the following steps: i) reacting the piperidine methacrylate A1) with the second component B) to form the polymer, and/or ii) reacting the methyl methacrylate A2) with the second component B) to form a reaction intermediate and reacting the reaction intermediate with the third component to form the polymer.

The polymer is useful for adjusting the total base number (TBN) and viscosity index (VI) of the lubricant composition. Said another way, the polymer and lubricant composition including the same can be used various types of combustion engines to help neutralize acids formed during the combustion process. The polymer, and therefore, the lubricant composition, also has excellent compatibility with various elastomeric seals, such as those encountered in combustions engines or related apparatuses.

DETAILED DESCRIPTION OF THE INVENTION

One of the key parts of a lubricating composition is the amount of basic material dispersed/dissolved within it, which is referred to as the total base number (TBN). This value is generally measured by two ASTM titration methods, ASTM D2896 and ASTM D4739. Most TBN has conventionally been delivered by use of overbased metal soaps, but these soaps created problems with some newer engine technologies (such as Diesel Particulate Filters—DPFs). Therefore, formulations that minimize use of such metal soaps are of value and may be referred to as "Low SAPS oils".

The requirements of the "Low SAPS" designation inherently restrict the amount of traditional calcium and magnesium based detergents found in the lubricating composition. These traditional detergents had many functions, including neutralization of acids formed during the combustion process and generated from the oxidation of base oil included in the lubricating composition. However, the limitation on the amount of these traditional calcium and magnesium based detergents that can be included has lowered the capacity of lubricant composition to neutralize acids. The decreased capacity of the lubricating composition to neutralize acids results in the need to change the lubricating composition more frequently.

The present invention provides a polymer and a lubricant composition comprising the polymer. In further embodiments, the lubricant composition consists essentially of the polymer, and in yet further embodiments, the lubricant composition consists of the polymer. The present invention also provides a method of forming the polymer. The lubricant composition and the invention method are described further below. The polymer is useful for adjusting the TBN and viscosity index (VI) of the lubricant composition. TBN may also be referred to as ashless TBN. As such, the polymer may be referred to as a viscosity index improver (VII) and/or viscosity modifier (VM). The polymer is useful for other purposes as well, which are described below. In general, the polymer improves the TBN of the lubricant composition relative to use of conventional TBN modifiers, while providing other benefits to the lubricant composition.

The lubricant composition can have various TBN values. TBN is an industry standard measurement used to correlate the basicity of any material to that of potassium hydroxide (KOH). The value is generally reported as mg KOH/g and can be measured according to ASTM D2896 or D4739. In various embodiments, the lubricant composition has a total TBN of from about 2.5 to about 25, about 5 to about 20, about 7.5 to about 15, or about 8 to about 13, mg KOH per gram of the lubricant composition, according to ASTM D2896. The TBN of the lubricant composition is generally impacted by the polymer. The polymer can provide various levels of TBN for the lubricant composition, such as from about 1 to about 8 mg KOH per gram sample, according to ASTM D2896. In various embodiments, the polymer (i.e., "neat" polymer) has a TBN of at least about 70, at least about 100, at least about 125, at least about 150, or a TBN greater than about 150, mg KOH per gram (mg KOH/g) of the polymer, according to ASTM D4739.

The lubricant composition can have various VI values. In various embodiments, the lubricant composition has a VI of from about 95 to about 220, about 100 to about 205, or about 105 to about 190, according to ASTM D2270. The VI of the lubricant composition is generally imparted by the polymer. The polymer can provide various levels of VI for the lubricant composition.

With further regard to VI of the lubricant composition, and without being bound or limited by any particular theory, it is thought that at lower temperatures, such as during equipment start-up, e.g. about −20° C., the polymer is less soluble in a base oil of the lubricant composition (described further below) and it occupies a small hydrodynamic volume within the lubricant composition. As such, the polymer has a lower contribution to viscosity of the lubricant composition at lower temperatures. This is important because the lubricant composition should remain fluid at lower temperatures to provide proper lubrication, such as when first starting a combustion engine from cold/ambient conditions. At higher temperatures, such as normal operating temperature of the equipment, e.g. about 100° C., the polymer becomes increasingly more soluble in the base oil and expands thereby increasing its hydrodynamic volume. As such, the polymer has a greater contribution to viscosity of the lubricant composition at higher temperatures. This is important because if the viscosity of the oil is reduced too much at higher temperatures, sufficient lubrication may not be achieved, such as when running the combustion engine for an extended period of time.

As described above, the polymer is useful for adjusting the TBN and VI of the lubricant composition. In addition, the polymer is generally non-aggressive toward elastomeric seals. In this way, the polymers are "multifunctional", i.e., the polymers provide more than one benefit to the lubricant composition. The seals are in particular a fluoropolymer elastomer used in O-rings and other goods. A specific type of fluoroelastomer is Viton®. The "fluoroelastomers" are categorized under ASTM D1418 and ISO 1629 designation of FKM for example. The fluoroelastomers comprise copolymers of hexafluoropropylene (HFP) and vinylidene fluoride (VDF of VF2), terpolymers of tetrafluoroethylene (TFE), vinylidene fluoride and hexafluoropropylene, perfluoromethylvinylether (PMVE), copolymers of TFE and propylene and copolymers of TFE, PMVE and ethylene. The fluorine content varies for example between about 66 to about 70% by weight. FKM is fluoro rubber of the polymethylene type having substituent fluoro and perfluoroalkyl or perfluoroalkoxy groups on the polymer chain.

The compatibility of the fluoroelastomer seals with the polymer/lubricant composition can be determined with the method defined in CEC-L-39-T96. Generally, conventional compounds such as alkyl amines are very damaging to fluoroelastomers. However, the polymer and lubricant composition including the polymer show positive results with regards to compatibility with fluoroelastomer seals.

The compatibility is generally assessed by submitting the seal or gaskets in the lubricant composition, heating the lubricant composition with the seal contained therein to an elevated temperature, and maintaining the elevated temperature for a period of time. The seals are then removed and dried, and the properties of the seal are assessed and compared to the seal specimens which were not heated in the lubricant composition. The percent change in these properties is assessed to determine the compatibility of the seal with the lubricant composition. The incorporation of the polymer into the lubricant composition decreases the tendency of the lubricant composition to degrade the seals, versus conventional compounds.

The polymer comprises a polymeric backbone. The polymeric backbone can comprise various chemistries, and can be linear or branched in structure. In various embodiments, the polymeric backbone of the polymer is linear and has a plurality of moieties extending therefrom. As such, the polymer can be referred to as a comb polymer. The moieties are described further below.

The polymeric backbone can be formed from various types of monomers. In certain embodiments, the polymeric backbone of the polymer comprises the reaction product of monomers selected from the group consisting of ethylene monomers, propylene monomers, butylene monomers, methacrylate monomers, vinyl acetate monomers, and combinations thereof. In these embodiments, the polymeric backbone can comprise, consist essentially of, or consist of, various copolymers of the aforementioned monomers. For example, the polymeric backbone of the polymer can comprise an ethylene-propylene copolymer, a polyisobutylene (PIB), a polymethacrylate (PMA), or an ethylene vinyl acetate (EVA). The ethylene-propylene copolymer may also be referred to as an olefin-copolymer. In one embodiment, the polymeric backbone comprises a PMA. Other monomers and combinations thereof can also be used to form the polymeric backbone.

The polymer further comprises at least one piperidine ester moiety extending from the polymeric backbone. In other words, the polymeric backbone is at least partially substituted or is formed from monomers having such a moiety (or moieties). In various embodiments, the polymer comprises a plurality of such piperidine ester moieties. Each of the piperidine ester moieties can comprise various chemistries and can be the same or different from each other.

In certain embodiments, the piperidine ester moiety is of the following general formula (I) below:

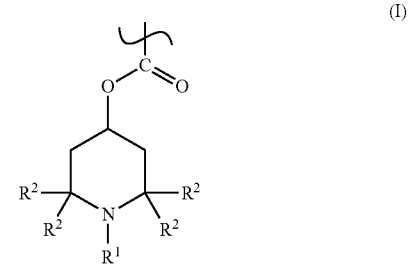

wherein each of $R^1$ and $R^2$ is individually a hydrogen or an alkyl group having from 1 to 17 carbons, or any number of carbon atoms in between. Various types of alkyl groups can be present, including, but not limited to, linear or branched alkyl groups having from 1 to 10 carbon atoms, e.g. methyl groups, ethyl groups, propyl groups, butyl groups, etc. In various embodiments, $R^1$ is a hydrogen or a methyl group ($CH_3$) and at least two, at least three, or all four, of the $R^2$ groups, are $CH_3$. Some of these embodiments may be referred to as hindered amines. In some of these embodiments, $R^1$ is a hydrogen. In other embodiments, $R^1$ is a $CH_3$. The S-shaped line in the formula above is merely meant to indicate that the moiety stems off of the polymeric backbone of the polymer, e.g. as a pendant group.

The piperidine ester moieties are useful for adjusting the TBN of the lubricant composition. The piperidine ester moieties may also be referred to as hindered amine moieties. In general, it is believed that increasing the amount of the piperidine ester moieties also increases the TBN of the lubricant composition. As such, the TBN of the lubricant composition can generally be changed by altering the amount of piperidine ester moieties present within the composition. The aforementioned total amount can be imparted by the number of piperidine ester moieties present on the polymer and/or the amount of polymer present in the composition.

In certain embodiments, the polymer further comprises at least one $C_8$ to $C_{22}$ ester moiety extending from the polymeric backbone. In various embodiments, the polymer comprises a plurality of such moieties, which are different from the piperidine ester moieties. Each of the $C_8$ to $C_{22}$ ester moieties can comprise various chemistries and can be the same or different from each other. In certain embodiments, the $C_8$ to $C_{22}$ ester moieties are linear in structure.

In certain embodiments, the $C_8$ to $C_{22}$ ester moiety is of the following general formula (II) below:

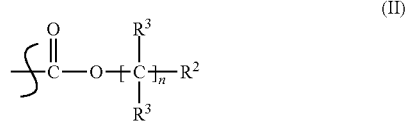

(II)

wherein $R^2$ is a $CH_3$, each $R^3$ is a hydrogen, and n is equal to 7, 9, 11, 13, 15, 17, 19, or 21. In further embodiments, n in formula (II) above is 9, 11, 13, or 15. In a specific embodiment, n is 9, i.e., the polymer includes at least one $C_{10}$ ester moiety. The $C_8$ to $C_{22}$ ester moieties are useful for adjusting the VI of the lubricant composition. In general, it is believed that increasing the amount of the $C_8$ to $C_{22}$ ester moieties also increases the VI of the lubricant composition. As such, the VI of the lubricant composition can generally be changed by altering the amount of $C_8$ to $C_{22}$ ester moieties present within the composition. The aforementioned total amount can be imparted by the number of $C_8$ to $C_{22}$ ester moieties present on the polymer and/or the amount of polymer present in the composition. The S-shaped line in the formula above is merely meant to indicate that the moiety stems off of the polymeric backbone of the polymer, e.g. as a pendant group. In certain embodiments, the polymer is of the following general formula (III) below:

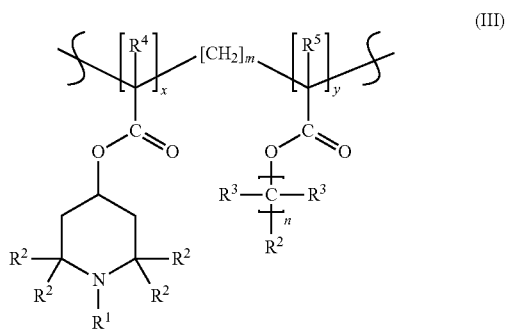

(III)

wherein $R^1$ is a hydrogen or a $CH_3$, each $R^2$ is a $CH_3$, each $R^3$ is a hydrogen, each of $R^4$ and $R^5$ is independently a hydrogen or a $CH_3$, n is equal to 9, 11, 13, 15, or 17, m≥1, 0<x<1, 0<y<1, and x+y=1. In further embodiments, $R^1$ is a hydrogen, and $R^4$ and $R^5$ are each a $CH_3$. In yet further embodiments, n in formula (III) above is 9, 11, 13, or 15. In one embodiment, n is 9. In certain embodiments, m in formula (III) above is 1. Various combinations of the aforementioned embodiments can be utilized. The S-shaped lines in the formula above are merely meant to indicate that the polymeric backbone extends further than that which is illustrated.

As introduced above, the amount of each of the moieties can vary. In formula (III) above, the moieties may be in a block or random configuration. In certain embodiments, the moieties alternate one after the other. In various embodiments, 0.05≤x≤0.3, 0.1≤x≤0.25, 0.15≤x≤0.25, or 0.2≤x≤0.25. In various embodiments, 0.7≤y≤0.95, 0.75≤y≤0.9, 0.75≤y≤0.85, or 0.75≤y≤0.80. In various embodiments, the polymer has a weight average molecular weight (Mw) of at least about 20,000, from about 20,000 to about 125,000, from about 20,000 to about 100,000, from about 20,000 to about 75,000, from about 25,000 to about 75,000, from about 35,000 to about 65,000, from about 40,000 to about 60,000, from about 45,000 to about 55,000, or about 50,000. Alternatively, the polymer has a Mw greater than about 20,000, greater than about 25,000, greater than about 50,000, greater than about 75,000, greater than about 100,000, or greater than about 125,000. Alternatively, the polymer has a Mw of from about 20,000 to about 50,000 or from about 50,000 to about 100,000. It is to be appreciated that the polymer may have various Mw values higher or lower than the aforementioned Mw ranges.

The method of forming the polymer comprises the steps of providing a first component and a second component different from the first component. In certain embodiments, the method further comprises the step of providing a third component. The third component is typically different from the first and second components. Each of the components may be provided as a starting raw material or formed via a prior reaction.

The first component comprises at least one of A1) a piperidine methacrylate, or A2) a methacrylate different from the piperidine methacrylate A1). In one embodiment, the first component comprises A1), i.e., one or more piperidine methacrylates, which may be the same or different from each other. Various types of piperidine methacrylates may be utilized. In certain embodiments, the piperidine methacrylate A1) comprises a 2,2,6,6-tetramethyl-4-piperidinyl methacrylate (TMPM), a 1,2,2,6,6-pentamethyl-4-piperidinyl methacrylate (PMPM), or a combination thereof. In one embodiment, A1) comprises TMPM. In another embodiment, A1) comprises PMPM. Suitable piperidine methacrylates are commercially available from a variety of suppliers, such as from BASF Corporation of Florham Park, N.J., and from Wako Chemicals USA, Inc. of Richmond, Va.

The second component comprises at least one of B) a $C_8$ to $C_{22}$ methacrylate. Various types of $C_8$ to $C_{22}$ methacrylates may be utilized. Such carbon chain lengths may be referred to as mid- to long-chains. The one or more $C_8$ to $C_{22}$ methacrylates may be the same or different from each other. In certain embodiments, B) comprises lauryl methacrylate (LMA). In the immediately preceding embodiments, B) generally comprises a mixture of $C_{12}$, $C_{14}$, and/or $C_{16}$ methacrylates. In one embodiment, B) comprises a $C_{10}$ methacrylate, Suitable $C_8$ to $C_{22}$ methacrylates are commercially available from a variety of suppliers, such as from BASF Corporation. An example of a suitable $C_{12}$ to $C_{16}$ methacrylate is Ageflex™ FM246, which is commercially available from BASF. Other examples of suitable methacrylates include lauryl methacrylates formed from $C_{12}$ to $C_{15}$ synthetic alcohols, both linear and branched, such as Neodol® 25 and Lial® 125, which are commercially available from Shell Chemicals and Sassol, respectively. Other suitable alcohols for forming the methacrylates include mixtures of average $C_{13}$ chain length, such as Exxal™ 13, which is commercially available from Exxon Mobil Chemical.

It is thought that the TBN of the polymer, and therefore, the lubricant composition, can be changed and/or tuned by altering the amount of the first component (e.g. TMPM and/or PMPM) utilized to form the polymer. It is also thought that the VI of the polymer, and therefore, the lubricant composition, can be changed and/or tuned by altering the amount of the second component (e.g. LMA) utilized to form the polymer. Without being bound or limited by any particular theory, it is thought that the second component allows the polymer to coil and condense upon itself as a function of temperature, which imparts the lubricant composition with excellent VI properties. In addition, it is thought that the second component can help to solubilize the polymer within the lubricant composition and also help to thicken the lubricant composition.

In one embodiment, the method further comprises the step of reacting A1) with B) to form the polymer. The components may be reacted in various ratios to form the polymer. In various embodiments, the piperidine methacrylate A1) and the $C_8$ to $C_{22}$ methacrylate B) are reacted in a molar ratio (A1:B) of from about 0.05:2 to about 0.75:1, about 0.1:1.5 to about 0.5:1, or about 0.15:1.4 to about 0.4:1.1, to form the polymer.

The components can be reacted in various types of vessels or reactors. The first and second components can be reacted at various temperatures. In various embodiments, the first and second components, e.g. A1) and B), are reacted at a temperature of from about 75 to about 115, about 85 to about 105, or about 95,° C..

The first and second components can be reacted for various amounts of time. In various embodiments, the first and second components are reacted for a period of time of from about 1 to about 12, about 1 to about 8, about 2 about 6, about 3 to about 5, or about 4 to about 5, hours. One method to determine the extent of reaction between the components is to test for the presence or level of unreacted carbon-carbon double bonds.

In another embodiment, the first component comprises A2), i.e., one or more methacrylates, which may be the same or different from each other. Various types of methacrylates can be utilized. In certain embodiments, A2) comprises a methyl methacrylate (MMA), more typically, methyl methacrylates. Suitable methacrylates are commercially available from a variety of suppliers, such as from BASF Corporation.

If A2) is employed in place of A1), the third component typically comprises at least one of C) a piperidine-ol. Various types of piperidine-ols may be utilized. In certain embodiments, C) comprises a 2,2,6,6-tetramethylpiperidin-4-ol (HTMP), a 1,2,2,6,6-pentamethylpiperidin-4-ol (PTMP), or a combination thereof. In one embodiment, C) comprises HTMP. In another embodiment, C) comprises PTMP. A combination of HTMP and PTMP can also be utilized. Suitable piperidine-ols are commercially available from a variety of suppliers, such as from BASF Corporation.

In embodiments where A2) is employed, the method further comprises the step of reacting A2) with B) to form a reaction intermediate. In these embodiments, the method further comprises the step of reacting the reaction intermediate with the third component to form the polymer. The components may be reacted at various temperatures and for various periods of time, such as those described above.

The method may further comprising the step of providing at least one of an initiator, a chain transfer agent (CTA), and/or an inert carrier. If employed, the initiator, the CTA, and/or the inert carrier are generally present during the step (or steps) of reacting.

If employed, various types of initiators may be utilized. Examples of suitable initiators include peroxides. The initiator is useful for facilitating reaction between at least the first and second components to form the polymer. In certain embodiments, the initiator comprises tert-butyl 2-ethylhexaneperoxoate (tBPEH). Suitable initiators are commercially available from a variety of suppliers, such as from AkzoNobel Polymer Chemicals LLC of Chicago, Ill. The initiator can be used in various amounts. In certain embodiments, the initiator is used in an amount of from about 0.001 to about 5, weight percent (wt %) based on 100 parts by weight of the first and second components (or first, second, and third components).

If employed, various types of CTAs may be utilized. Examples of suitable CTAs include, but are not limited to, thiols. The CTA is useful for facilitating reaction between at least the first and second components to form the polymer. In certain embodiments, the CTA comprises dodecane-1-thiol (DDM). Suitable CTAs are commercially available from a variety of suppliers, such as from Sigma-Aldrich of St. Louis, Mo. The CTA can be used in various amounts. In certain embodiments, the CTA is used in an amount of from about 0.001 to about 5 wt % based on 100 parts by weight of the first and second components (or first, second, and third components).

If employed, various types of inert carriers may be utilized. Examples of suitable carriers include inert basestocks. By "inert", it is generally meant that the inert carrier is unreactive toward at least the first and second, and if utilized, the third, components. The inert carrier is useful for facilitating reaction between at least the first and second components to form the polymer by acting as a medium. In certain embodiments, the inert carrier comprises a mineral oil. Suitable inert carriers are commercially available from a variety of a variety of suppliers, such as from Petro-Canada. An example of a suitable basestock is 60 Neutral Light HT (N60LHT), commercially available from Petro-Canada.

In various embodiments, the lubricant composition further comprises a base oil in addition to the polymer. The base oil may be the same as or different from the inert carrier described above. The polymer can be present in the lubricant composition in various amounts. In various embodiments, the polymer is present in an amount of from about 0.1 to about 15, 0.25 to about 10, about 0.5 to about 8, about 1 to about 5, or about 1.5 to about 3, wt %, each based on 100 parts by weight of the lubricant composition.

In certain embodiments, the base oil is selected from the group of American Petroleum Institute (API) Group I base oils, API Group II base oils, API Group III base oils, API Group IV base oils, API Group V base oils, and combinations thereof. In these embodiments, the base oil is generally classified in accordance with the API Base Oil Interchangeability Guidelines. In other words, the base oil may be further described as one or more of five types of base oils: Group I (sulphur content >0.03 wt. %, and/or <90 wt. % saturates, viscosity index 80-119); Group II (sulphur content less than or equal to 0.03 wt. %, and greater than or equal to 90 wt. % saturates, viscosity index 80-119); Group III (sulphur content less than or equal to 0.03 wt. %, and greater than or equal to 90 wt. % saturates, viscosity index greater than or equal to 120); Group IV (all polyalphaolefins (PAO's)); and Group V (all others not included in Groups I, II, III, or IV).

The base oil may be further defined as a crankcase lubrication oil for spark-ignited and compression ignited internal combustion engines, including automobile and truck engines, two-cycle engines, aviation piston engines, and marine and railroad diesel engines. Alternatively, the base oil can be further defined as an oil to be used in gas engines, stationary power engines, and turbines. The base oil may be further defined as heavy or light duty engine oil. In one embodiment, the base oil is further defined as heavy duty diesel engine oil.

The base oil may be further defined as base stock oil. Alternatively, the base oil may be further defined as a component that is produced by a single manufacturer to the same specifications (independent of feed source or manufacturer's location) that meets the same manufacturer's specification and that is identified by a unique formula, product identification number, or both. The base oil may be manufactured or derived using a variety of different processes including, but not limited to, distillation, solvent refining, hydrogen processing, oligomerization, esterification, and re-refining. Re-refined stock is typically substantially free from materials introduced through manufacturing, contamination, or previous use.

Alternatively, the base oil may be derived from hydrocracking, hydrogenation, hydrofinishing, refined and re-refined oils or mixtures thereof or may include one or more such oils. In one embodiment, the base oil is further defined as an oil of lubricating viscosity such as natural or synthetic oil and/or combinations thereof. Natural oils include, but are not limited to, animal oils and vegetable oils (e.g., castor oil, lard oil) as well as liquid petroleum oils and solvent-treated or acid-treated mineral lubricating oils such as paraffinic, naphthenic or mixed paraffinic-naphthenic oils.

In various other embodiments, the base oil may be further defined as oil derived from coal or shale. Non-limiting examples of suitable oils include hydrocarbon oils such as polymerized and interpolymerized olefins (e.g., polybutylenes, polypropylenes, propylene-isobutylene copolymers, poly(1-hexenes), poly(1-octenes), poly(1-decenes), and mixtures thereof; alkylbenzenes (e.g., dodecylbenzenes, tetradecylbenzenes, dinonylbenzenes, and di(2-ethylhexyl)-benzenes); polyphenyls (e.g., biphenyls, terphenyls, and alkylated polyphenyls), alkylated diphenyl ethers and alkylated diphenyl sulfides and the derivatives, analogs, and homologs thereof.

In still other embodiments, the base oil may be further defined as synthetic oil which may include one or more alkylene oxide polymers and interpolymers and derivatives thereof wherein terminal hydroxyl groups are modified by esterification, etherification, or similar reactions. In various embodiments, these synthetic oils are prepared through polymerization of ethylene oxide or propylene oxide to form polyoxyalkylene polymers which can be further reacted to form the oils. For example, alkyl and aryl ethers of these polyoxyalkylene polymers (e.g., methylpolyisopropylene glycol ether having an average molecular weight of 1,000; diphenyl ether of polyethylene glycol having a molecular weight of 500-1,000; and diethyl ether of polypropylene glycol having a molecular weight of 1,000-1,500) and/or mono- and polycarboxylic esters thereof (e.g. acetic acid esters, mixed $C_3$-$C_8$ fatty acid esters, or the $C_{13}$ oxo acid diester of tetraethylene glycol) may also be utilized.

In even further embodiments, the base oil may include esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, and alkenyl malonic acids) with a variety of alcohols (e.g., butyl alcohol, hexyl alcohol, dodecyl alcohol, 2-ethylhexyl alcohol, ethylene glycol, diethylene glycol monoether, and propylene glycol). Specific examples of these esters include, but are not limited to, dibutyl adipate, di(2-ethylhexyl sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and combinations thereof. Esters useful as the base oil or as included in the base oil also include those formed from $C_5$ to $C_{12}$ monocarboxylic acids and polyols and polyol ethers such as neopentyl glycol, trimethylolpropane, pentaerythritol, dipentaerythritol, and tripentaerythritol.

The base oil may be alternatively described as refined oil, re-refined oil, unrefined oil or combinations thereof. Unrefined oils are typically obtained from a natural or synthetic source without further purification treatment. For example, a shale oil obtained directly from retorting operations, petroleum oil obtained directly from distillation, or ester oil obtained directly from an esterification process and used without further treatment, could all be utilized. Refined oils are similar to the unrefined oils except that they typically have undergone purification to improve one or more properties. Many such purification techniques are known to those of skill in the art such as solvent extraction, acid or base extraction, filtration, percolation, and similar purification techniques. Re-refined oils are also known as reclaimed or reprocessed oils and often are additionally processed by techniques directed to removal of spent additives and oil breakdown products.

In various embodiments, the base oil is present in the lubricant composition in an amount of from about 70 to about 99.9, about 80 to about 99.9, about 90 to about 99.9, about 75 to about 95, about 80 to about 90, or about 85 to about 95, wt. %, each based on 100 parts by weight of the lubricant composition. Alternatively, the base oil may be present in the lubricant composition in amounts of greater than about 70, about 75, about 80, about 85, about 90, about 91, about 92, about 93, about 94, about 95, about 96, about 97, about 98, or about 99, wt. %, each based on 100 parts by weight of the lubricant composition. In various embodiments, the amount of base oil in a fully formulated lubricant composition (including additives, diluents, and/or carrier oils, etc.) is from about 80 to about 99.5, about 85 to about 96, or about 87 to about 95, wt. %.

In various embodiments, the base oil has a viscosity ranging from about 1 to about 100, about 1 to about 50, about 1 to about 25, or about 1 to about 20, centistokes (cSt), when tested at 100° C. Viscosity of the base oil can be determined by various methods understood in the art. The present invention is not limited to a particular viscosity of the base oil.

The lubricant composition may additionally include one or more additives to improve various chemical and/or physical properties of the lubricant composition. Specific examples of the one or more additives include anti-wear additives, antioxidants, metal deactivators (or passivators), rust inhibitors, viscosity index improvers, pour point depressors, dispersants, detergents, and antifriction additives. Each of the additives may be used alone or in combination. The additive(s) can be used in various amounts, if employed. The lubricant composition may be formulated with the additional of several auxiliary components to achieve certain performance objectives for use in certain applications. For example, the lubricant composition may be a rust and oxidation lubricant formulation, a hydraulic lubricant formulation, turbine lubricant oil, and an internal combustion engine lubricant formulation. In alternate embodiments, the lubricant composition can be completely free of one or more of the additives described herein.

In certain embodiments, the lubricant composition comprises the polymer, and one or more additives, but is free of the base oil. In the immediately preceding embodiments, the lubricant composition may be referred to as a performance additive package. The polymer and additive(s) can be present in the performance additive package in various amounts described herein. In related embodiments, the performance additive package consists essentially of, or consists of, the polymer and one or more additives.

If employed, the anti-wear additive can be of various types. In one embodiment, the anti-wear additive is a zinc dialkyl-dithio phosphate (ZDDP). Alternatively, the anti-wear additive may include sulfur- and/or phosphorus- and/or halogen-containing compounds, e.g. sulfurised olefins and vegetable oils, zinc dialkyldithiophosphates, alkylated triphenyl phosphates, tritolyl phosphate, tricresyl phosphate, chlorinated paraffins, alkyl and aryl di- and trisulfides, amine salts of mono- and dialkyl phosphates, amine salts of methylphosphonic acid, diethanolaminomethyltolyltriazole, bis (2-ethylhexyl)aminomethyltolyltriazole, derivatives of 2,5-dimercapto-1,3,4-thiadiazole, ethyl3-[(diisopropoxyphosphinothioyl)thio]propionate, triphenyl thiophosphate (triphenylphosphorothioate), tris(alkylphenyl)phosphorothioate and mixtures thereof (for example tris(isononylphenyl)phosphorothioate), diphenyl mononylphenyl phosphorothioate, isobutylphenyl diphenyl phosphorothioate, the dodecylamine salt of 3-hydroxy-1,3-thiaphosphetane 3-oxide, trithiophosphoric acid 5,5,5-tris [isooctyl 2-acetate], derivatives of 2-mercaptobenzothiazole such as 1-[N,N-bis (2-ethylhexyl)aminomethyl]-2-mercapto-1H-1,3-benzothiazole, ethoxycarbonyl-5-octyldithio carbamate, and/or combinations thereof.

If employed, the anti-wear additive can be used in various amounts. In certain embodiments, the anti-wear additive is present in the lubricant composition in an amount of from about 0.1 to about 20, about 0.5 to about 15, about 1 to about 10, about 5 to about 10, about 5 to about 15, about 5 to about 20, about 0.1 to about 1, about 0.1 to about 0.5, or about 0.1 to about 1.5, wt. %, each based on 100 parts by weight of the lubricant composition. Alternatively, the anti-wear additive may be present in amounts of less than about 20, less than about 15, less than about 10, less than about 5, less than about 1, less than about 0.5, or less than about 0.1, wt. %, each based on 100 parts by weight of the lubricant composition.

If employed, the antioxidant can be of various types. Suitable antioxidants include alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6(1'-methylundec-1'-yl)phenol, 2,4-dimethyl-6-(1'-methylheptadec-1'-yl)phenol, 2,4-dimethyl-6-(1'-methyltridec-1'-yl)phenol, and combinations thereof.

Further examples of suitable antioxidants includes alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol, and combinations thereof. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate, and combinations thereof, may also be utilized.

Furthermore, hydroxylated thiodiphenyl ethers, for example 2,2'-thiobis(6-tert-butyl-4-methylphenol), 2,2'-thiobis (4-octylphenol), 4,4'-thiobis(6-tert-butyl-3-methylphenol), 4,4'-thiobis(6-tert-butyl-2-methylphenol), 4,4'-thio-bis-(3,6-di-sec-amylphenol), 4,4'-bis-(2,6-dimethyl-4-hydroxyphenyl) disulfide, and combinations thereof, may also be used.

It is also contemplated that alkylidenebisphenols, for example 2,2'-methylenebis(6-tert-butyl-4-methylphenol), 2,2'-methylenebis (6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis (4,6-di-tert-butylphenol), 2,2'-ethylidenebis (4,6-di-tert-butylphenol), 2,2'-ethylidenebis (6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis (2,6-di-tert-butylphenol), 4,4'-methylenebis(6-tert-butyl-2-methylphenol),1,1-bis (5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis(5-tert-butyl-4-hydroxy-2-methyl-phenyl)-3-n-dodecylmercapto butane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methyl phenyl)pentane, and combinations thereof may be utilized as antioxidants in the lubricant composition.

O-, N- and S-benzyl compounds, for example 3,5,3',5'-tetra-tert-butyl-4,4'-dihydroxydibenzyl ether, octadecyl-4- hydroxy-3,5-dimethylbenzylmercaptoacetate, tris-(3,5-di-tert-butyl-4-hydroxybenzyl)amine, bis(4-tert-butyl-3-hydroxy-2,6-dimethylbenzyl)dithiol terephthalate, bis(3,5-di-tert-butyl-4-hydroxybenzyl)sulfide, isooctyl-3,5di-tert-butyl-4-hydroxy benzylmercaptoacetate, and combinations thereof, may also be utilized.

Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate, and combinations thereof are also suitable for use as antioxidants.

Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris (3,5-di-tert-butyl-4-hydroxybenzyl)isocyanurate, 1,3,5-tris (4-tert-butyl-3-hydroxy-2,6-dimethylbenzyl 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl) isocyanurate, and combinations thereof, may also be used.

Additional examples of antioxidants include aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl) phenol, and combinations thereof. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid, and combinations thereof, may also be utilized. In addition, acylaminophenols, for example 4-hydroxylauranilide, 4-hydroxystearanilide, octyl N-(3,5-di-tert-butyl-4-hydroxyphenyl)carbamate.

Esters of [3-(3,5-di-tert-butyl-4-hydroxyphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane, and combinations thereof, may also be used. It is further contemplated that esters of β-(5-tert-butyl-4-hydroxy-3-methylphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and combinations thereof, may be used.

Additional examples of suitable antioxidants include those that include nitrogen, such as amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis (3,5-di-tert-butyl-4-hydroxyphenylpropionyl)hydrazine. Other suitable examples of antioxidants include aminic antioxidants such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N-bis(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino methylphenol, 2,4'-diaminodiphenylmethane, 4,4'-diaminodiphenylmethane, N,N,N',N'-tetramethyl-4,4'-diaminodiphenylmethane, 1,2-bis[(2-methyl-phenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated isopropyl/isohexyldiphenylamines, mixtures of mono- and dialkylated tert-butyldiphenylamines, 2,3-dihydro-3,3-dimethyl-4H-1, 4-benzothiazine, phenothiazine, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethyl piperid-4-yl)sebacate, 2,2,6,6-tetramethylpiperidin-4-one and 2,2,6,6-tetramethyl piperidin-4-ol, and combinations thereof.

Even further examples of suitable antioxidants include aliphatic or aromatic phosphites, esters of thiodipropionic acid or of thiodiacetic acid, or salts of dithiocarbamic or dithiophosphoric acid, 2,2,12,12-tetramethyl-5,9-dihydroxy-3,7,1trithiatridecane and 2,2,15,15-tetramethyl-5,12-dihydroxy-3,7,10,14-tetrathiahexadecane, and combinations thereof. Furthermore, sulfurized fatty esters, sulfurized fats and sulfurized olefins, and combinations thereof, may be used.

If employed, the antioxidant can be used in various amounts. In certain embodiments, the antioxidant is present in the lubricant composition in an amount of from about 0.01 to about 5, about 0.05 to about 4, about 0.1 to about 3, or about 0.5 to about 2, wt. %, each based on 100 parts by weight of the lubricant composition. Alternatively, the antioxidant may be present in amounts of less than about 5, less than about 4, less than about 3, or less than about 2, wt. %, each based on 100 parts by weight of the lubricant composition.

If employed, the metal deactivator can be of various types. Suitable metal deactivators include benzotriazoles and derivatives thereof, for example 4- or 5-alkylbenzotriazoles (e.g. tolutriazole) and derivatives thereof, 4,5,6,7-tetrahydrobenzotriazole and 5,5'-methylenebisbenzotriazole; Mannich bases of benzotriazole or tolutriazole, e.g. 1-[bis(2-ethylhexyl)aminomethyl)tolutriazole and 1-[bis(2-ethylhexyl)aminomethyl)benzotriazole; and alkoxyalkylbenzotriazoles such as 1-(nonyloxymethyl)benzotriazole, 1-(1-butoxyethyl)benzotriazole and 1-(1-cyclohexyloxybutyl)tolutriazole, and combinations thereof.

Additional examples of suitable metal deactivators include 1,2,4-triazoles and derivatives thereof, for example 3-alkyl(or aryl)-1,2,4-triazoles, and Mannich bases of 1,2,4-triazoles, such as 1-[bis(2-ethylhexyl)aminomethyl-1,2,4-triazole; alkoxyalkyl-1,2,4-triazoles such as 1-(1-butoxyethyl)-1,2,4-triazole; and acylated 3-amino-1,2,4-triazoles, imidazole derivatives, for example 4,4'-methylenebis(2-undecyl-5-methylimidazole) and bis[(N-methyl)imidazol-2-yl] carbinol octyl ether, and combinations thereof. Further examples of suitable metal deactivators include sulfur-containing heterocyclic compounds, for example 2-mercaptobenzothiazole, 2,5-dimercapto-1,3,4-thiadiazole and derivatives thereof; and 3,5-bis[di(2-ethylhexyl)aminomethyl]-1,3,4-thiadiazolin-2-one, and combinations thereof. Even further examples of metal deactivators include amino compounds, for example salicylidenepropylenediamine, salicylaminoguanidine and salts thereof, and combinations thereof.

If employed, the metal deactivator can be used in various amounts. In certain embodiments, the metal deactivator is present in the lubricant composition in an amount of from about 0.01 to about 0.1, about 0.05 to about 0.01, or about 0.07 to about 0.1, wt. %, each based on 100 parts by weight of the lubricant composition. Alternatively, the metal deactivator may be present in amounts of less than about 0.1, less than about 0.7, or less than about 0.5, wt. %, each based on 100 parts by weight of the lubricant composition.

If employed, the rust inhibitor and/or friction modifier can be of various types. Suitable examples of rust inhibitors and/or friction modifiers include organic acids, their esters, metal salts, amine salts and anhydrides, for example alkyl- and alkenylsuccinic acids and their partial esters with alcohols, diols or hydroxycarboxylic acids, partial amides of alkyl- and alkenylsuccinic acids, 4-nonylphenoxyacetic acid, alkoxy- and alkoxyethoxycarboxylic acids such as dodecyloxyacetic acid, dodecyloxy(ethoxy)acetic acid and the amine salts thereof, and also N-oleoylsarcosine, sorbitan monooleate, lead naphthenate, alkenylsuccinic anhydrides, for example dodecenylsuccinic anhydride, 2-carboxymethyl-1-dodecyl-3-methylglycerol and the amine salts thereof, and combinations thereof. Additional examples include nitrogen-containing compounds, for example, primary, secondary or tertiary aliphatic or cycloaliphatic amines and amine salts of organic and inorganic acids, for example oil-soluble alkylammonium carboxylates, and also 1-[N,N-bis(2-hydroxyethyl)amino]-3-(4-nonylphenoxy) propan-2-ol, and combinations thereof. Further examples include heterocyclic compounds, for example: substituted imidazolines and oxazolines, and 2-heptadecenyl-1-(2-hydroxyethyl)imidazoline, phosphorus-containing compounds, for example: amine salts of phosphoric acid partial esters or phosphonic acid partial esters, and zinc dialkyldithiophosphates, molybdenum-containing compounds, such as molydbenum dithiocarbamate and other sulphur and phosphorus containing derivatives, sulfur-containing compounds, for example: barium dinonylnaphthalenesulfonates, calcium petroleum sulfonates, alkylthio-substituted aliphatic carboxylic acids, esters of aliphatic 2-sulfocarboxylic acids and salts thereof, glycerol derivatives, for example: glycerol monooleate, 1-(alkylphenoxy)-3-(2-hydroxyethyl)glycerols, 1-(alkylphenoxy)-3-(2,3-dihydroxypropyl)glycerols and 2-carboxyalkyl-1,3-dialkylglycerols, and combinations thereof.

If employed, the rust inhibitor and/or friction modifier can be used in various amounts. In certain embodiments, the rust inhibitor and/or friction modifier is/are present in the lubricant composition in an amount of from about 0.01 to about 0.1, about 0.05 to about 0.01, or about 0.07 to about 0.1, wt. %, each based on 100 parts by weight of the lubricant composition. Alternatively, the rust inhibitor and/or friction modifier may be present in amounts of less than about 0.1, less than about 0.7, or less than about 0.5, wt. %, each based on 100 parts by weight of the lubricant composition.

If employed, the viscosity index improver (VII) can be of various types and is different from the polymer, which may also be characterized as a VII or more specifically, as a supplemental VII. Suitable examples of supplemental VIIs include polyacrylates, polymethacrylates, vinylpyrrolidone/methacrylate copolymers, polyvinylpyrrolidones, polybutenes, olefin copolymers, styrene/acrylate copolymers and polyethers, and combinations thereof.

If employed, the supplemental VII can be used in various amounts. In certain embodiments, the supplemental VII is present in the lubricant composition in an amount of from about 0.01 to about 25, about 1 to about 20, or about 1 to about 15, wt. %, each based on 100 parts by weight of the lubricant composition. Alternatively, the supplemental VII may be present in amounts upwards of about 25, upwards of about 20, or upwards of about 15, wt. %, each based on 100 parts by weight of the lubricant composition.

If employed, the pour point depressant can be of various types. Suitable examples of pour point depressants include polymethacrylate and alkylated naphthalene derivatives, and combinations thereof.

If employed, the pour point depressant can be used in various amounts. In certain embodiments, the pour point depressant is present in the lubricant composition in an amount of from about 0.01 to about 0.1, about 0.05 to about 0.01, or about 0.07 to about 0.1, wt. %, each based on 100 parts by weight of the lubricant composition. Alternatively, the pour point depressant may be present in amounts of less than about 0.1, less than about 0.7, or less than about 0.5, wt. %, each based on 100 parts by weight of the lubricant composition.

If employed, the dispersant can be of various types. Suitable examples of dispersants include polybutenylsuccinic amides or -imides, polybutenylphosphonic acid derivatives and basic magnesium, calcium and barium sulfonates and phenolates, succinate esters and alkylphenol amines (Mannich bases), and combinations thereof.

If employed, the dispersant can be used in various amounts. In certain embodiments, the dispersant is present in the lubricant composition in an amount of from about 0.01 to about 25, about 0.1 to about 20, about 0.5 to about 15, about 1 to about 12, or about 2.5 to about 9, wt. %, each based on 100 parts by weight of the lubricant composition. Alternatively, the dispersant may be present in amounts upwards of about 25, upwards of about 20, upwards of about 15, or upwards of about 12, wt. %, each based on 100 parts by weight of the lubricant composition.

If employed, the detergent can be of various types. Suitable examples of detergents include overbased or neutral metal sulphonates, phenates and salicylates, and combinations thereof.

If employed, the detergent can be used in various amounts. In certain embodiments, the detergent is present in the lubricant composition in an amount of from about 0.01 to about 5, about 0.1 to about 4, about 0.5 to about 3, or about 1 to about 3, wt. %, each based on 100 parts by weight of the lubricant composition. Alternatively, the detergent may be present in amounts of less than about 5, less than about 4, less than about 3, less than about 2, or less than about 1, wt. %, each based on 100 parts by weight of the lubricant composition.

In various embodiments, the lubricant composition is substantially free of water, e.g. the lubricant composition includes less than about 5, less than about 4, less than about 3, less than about 2, less than about 1, less than about 0.5, or less than about 0.1, wt. % of water. Alternatively, the lubricant composition may be completely free of water.

Some of the compounds described above may interact in the lubricant composition, so the components of the lubricant composition in final form may be different from those components that are initially added or combined together. Some products formed thereby, including products formed upon employing the lubricant composition in its intended use, are not easily described or describable. Nevertheless, all such modifications, reaction products, and products formed upon employing the lubricant composition in its intended use, are expressly contemplated and hereby included herein. Various embodiments include one or more of the modification, reaction products, and products formed from employing the lubricant composition, as described above.

A method of lubricating a system comprising a fluoropolymer seal is also provided. The method comprises contacting the fluoropolymer seal with the lubricant composition described above. The system may further comprise an internal combustion engine. Alternatively, the system may further comprise any combustion engine or application that utilizes a lubricant composition in contact with a fluoropolymer seal, which may also be referred to as a fluoroelastomer seal.

The following examples, illustrating the polymer and method, are intended to illustrate and not to limit the invention.

EXAMPLES

Examples of the polymer and lubricant composition are prepared. The polymers are prepared using a reactor. The reactor comprises a glass flask. The reactor is utilized with a mechanical stirrer, a heating mantle having a thermostat, reflux condenser, and an inert purge (e.g. a nitrogen purge).

To form the polymers, the first and second components, a portion of the inert carrier, and the CTA are added to a 500 mL Erlenmeyer flask and mixed with a stir bar to form a monomer mix. Heat is added, as necessary. Another portion of the inert carrier and the initiator are added to an open beaker and mixed with a stir bar to form an initiator mix. Yet another portion of the inert carrier is added to the reactor, as an initial reactor heel.

A feed pump is set up to dose the monomer mix to the reactor over a period of two hours. Another feed pump is set up to dose the initiator mix to the reactor over a period of three hours. The initiator reactor heel is heated under constant inert sparge to 95° C. After ~1 hour, a portion of the initiator mix is added to the reactor as an initiator heel charge via syringe. Immediately thereafter, both of the feed pumps are started to feed the monomer initiator mixes to the reactor at their prescribed rates.

The mixes are stirred in the reactor at a rate of about 300 RPM. After the monomer mix is fully added to the reactor via its feed pump, stirring is increased to about 450 RPM and the feed pump for the initiator mix is doubled in rate such that addition of the initiator mix concludes after ~2.5 hrs (rather than three hours).

The reactor is held at 95° C. for an additional hour after fully feeding both mixes to the reactor and stirring is continued at about 450 RPM. A chaser of the initiator mix is then added to the reactor. The reactor is held at 95° C. for an additional hour and stirring is continued at about 450 RPM. Heating is then removed from the reactor.

Overall, the total reaction time between the components is about 2 hours, with a total batch time of about 4.5 hours to account for adding additional amounts of initiator mix after adding all of the monomer mix to the reactor.

Six different example polymers are formed according to the aforementioned method utilizing different types and amounts of components. The batch sizes for reaction are roughly 500 grams each. The six different polymers are shown in Table I below. Physical properties of each of the polymers are measured after formation. The solid content of each example comprises the polymer itself with remainder being primarily the inert carrier which serves as a carrier for the initiator and as a diluent for the polymer during formation.

The weight percents of the first and second components in Table I are with respect to 100 parts by weight of both first and second components combined. Generally, the total amount of the first and second components prior to reaction is about 350 grams out of the total batch size, i.e., out of 500 grams. Much of the remainder is made up of the inert carrier, with smaller amounts of the initiator and CTA completing the batch. The weight percents of the initiator and CTA in Table I are each based on 100 parts of actives, i.e., 100 parts of both first and second component combined.

TABLE I

| | Polymer Examples | | | | | |
| --- | --- | --- | --- | --- | --- | --- |
| | 1 | 2 | 3 | 4 | 5 | 6 |
| Component | | | | | | |
| First Component #1 (wt. %) | 10 | 15 | 20 | 0 | 0 | 0 |
| First Component #2 (wt. %) | 0 | 0 | 0 | 10 | 15 | 20 |
| Second Component (wt. %) | 90 | 85 | 80 | 90 | 85 | 80 |
| Inert Carrier | Y | Y | Y | Y | Y | Y |
| Initiator (wt. %) | 0.43 | 0.43 | 0.43 | 0.43 | 0.43 | 0.43 |
| CTA (wt. %) | 0.60 | 0.60 | 0.60 | 0.60 | 0.60 | 0.60 |
| Physical Properties | | | | | | |
| Solid Content (wt. %) | 70 | 70 | 70 | 70 | 70 | 70 |
| Mn | 29,107 | 26,107 | 22,274 | 26,659 | 23,361 | 18,508 |
| Mw | 52,981 | 51,330 | 35,923 | 46,697 | 38,846 | 30,042 |
| PDI | 1.82 | 1.97 | 1.61 | 1.75 | 1.66 | 1.62 |

First Component #1 is TMPM, commercially available from Wako Chemicals USA of Richmond, Va.

First Component #2 is TMPM, commercially available from BASF Corporation of Florham Park, N.J.

Second Component is FM246, commercially available from AkzoNobel of Chicago, Ill.

Inert Carrier is PC N60LHT, commercially available from Petro-Canada.

Initiator is tert-butyl 2-ethylhexaneperoxoate (tBPEH), commercially available from Polymer Chemicals LLC of Chicago, Ill.

CTA is dodecane-1-thiol (DDM), commercially available from Sigma-Aldrich of St. Louis, Mo.

Number average molecular weight (Mn), weight average molecular weight (Mw), and polydispersity Index (PDI) of each of the polymers is determined using Gel Permeation Chromatography (GPC) standardized against polymethyl methacrylate standards obtained from Polymer Laboratories of Amherst, Mass.

Each of the polymers is mixed with a base oil to form different lubricant compositions. Examples of these compositions are shown in Table II below. Total Base Number (TBN) of each of the lubricant compositions is determined according to ASTM D2896. Kinematic viscosity (KV) is determined by ASTM D445 and the viscosity index (VI) of each of the lubricant composition is determined according to ASTM D2270.

TABLE II

| | Lubricant Composition Examples | | | | | | |
|---|---|---|---|---|---|---|---|
| Polymer (P) | P1 | P2 | P3 | P4 | P5 | P6 | Base Oil (BO) |
| TBN: 5 wt. % P in BO | 0.91 | 1.39 | 1.92 | 0.85 | 1.31 | 1.68 | 0 |
| TBN: 12 wt. % P in BO | 2.23 | 3.36 | 4.53 | 1.98 | 3.14 | 4.16 | 0 |
| KV: 5 wt. % P in BO (in cSt @40° C.) | 50.60 | 52.83 | 51.88 | 66.26 | 54.42 | 70.73 | 35.66 |
| KV: 5 wt. % P in BO (in cSt @100° C.) | 9.36 | 9.98 | 9.74 | 12.63 | 10.07 | 13.56 | 6.43 |
| VI: 5 wt. % P in BO | 172 | 180 | 178 | 195 | 176 | 199 | 134 |

In Table II above, "Base Oil" is just the base oil without any polymers included therein (i.e., untreated or virgin base oil). The base oil is YUBASE® 6, which is commercially available from SK lubricants of Seoul, South Korea. P1-P6 each individually correspond to the polymers 1-6 described above in Table I, which are included in the base oil at loading levels of 5 wt. % and 12 wt. % as shown in Table II. For example, 5 wt. % of polymer 1 (P1) is included in the base oil (BO) and has a TBN of 0.95, whereas the base oil on its own has a TBN of zero (0). The polymers provide excellent TBN and VI properties relative to conventional compounds. The polymers also provide excellent viscosity profiles for the lubricant compositions.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims.

What is claimed is:

1. A lubricant composition comprising:

a base oil; and a polymer for adjusting the total base number (TBN) and viscosity index (VI) of said lubricant composition, said polymer is of general formula (III);

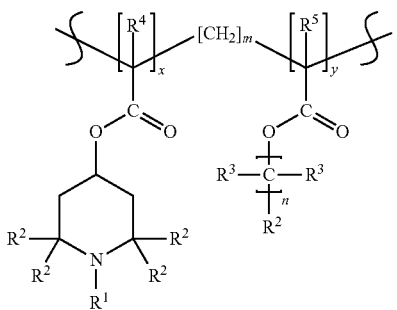

(III)

wherein $R^1$ is a hydrogen or a methyl group ($CH_3$), each $R^2$ is a $CH_3$, each $R^3$ is a hydrogen or a methyl group ($CH_3$) or an ethyl group ($CH_2CH_3$) or a propyl group ($CH_2CH_2CH_3$) or an isopropyl group ($CH(CH_3)_2$), each of $R^4$ and $R^5$ is independently a hydrogen or a $CH_3$, n is equal to 7, 9, 11, 13, 15, or 17, m≥1, 0.15≤x≤0.25 and 0.75≤y≤0.85, and x+y=1; and wherein said polymer is present in an amount of from about 1 to about 10 wt% based on the total weight of said lubricant composition.

2. The lubricant composition as set forth in claim 1 wherein $R_1$ is a hydrogen.

3. The lubricant composition as set forth in claim 1 wherein:
i) $R^1$ is a hydrogen, each of $R^4$ and $R^5$ is a $CH_3$, and n is 9, 11, 13, or 15 in general formula (III).

4. The lubricant composition as set forth in claim 1 wherein said polymer has a weight average molecular weight (Mw) of at least about 20,000.

5. The lubricant composition as set forth in claim 1 wherein said base oil:
i) is selected from the group of American Petroleum Institute (API) Group I base oils, API Group II base oils, API Group III base oils, API Group IV base oils, API Group V base oils, and combinations thereof;
ii) has a viscosity of from about 1 to about 100 cSt at 100° C. according to ASTM D2270; or
iii) both i) and ii).

6. The lubricant composition as set forth in claim 1 wherein said polymer:
i) provides from about 1 to about 8 mg KOH per gram sample according to ASTM D2896.

7. The lubricant composition as set forth in claim 1, having:
i) a total TBN of from about 2.5 to about 25 according to ASTM D2896;
ii) a VI of from about 95 to about 220 according to ASTM D2270; or
iii) both i) and ii).

* * * * *